(12) United States Patent
Narayanaswami et al.

(10) Patent No.: US 7,512,402 B2
(45) Date of Patent: Mar. 31, 2009

(54) CENTRALIZED DISPLAY FOR MOBILE DEVICES

(75) Inventors: Chandrasekhar Narayanaswami, Wilton, CT (US); Mandayam Thondanur Raghunath, Fishkill, NY (US); Claudio S. Pinhanez, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 10/845,795

(22) Filed: May 14, 2004

(65) Prior Publication Data

US 2005/0256697 A1 Nov. 17, 2005

(51) Int. Cl.
*H04M 1/00* (2006.01)

(52) U.S. Cl. .................. 455/420; 455/557; 455/566

(58) Field of Classification Search .............. 455/557, 455/556.1, 418, 558, 420, 566; 703/23
See application file for complete search history.

(56) References Cited

U.S. PATENT DOCUMENTS

| | | | |
|---|---|---|---|
| 6,356,543 B2 * | 3/2002 | Hall et al. .................... 370/352 |
| 6,694,134 B1 * | 2/2004 | Lu et al. ...................... 455/419 |
| 2003/0115038 A1 * | 6/2003 | Want et al. ...................... 703/24 |
| 2003/0211865 A1 * | 11/2003 | Azami et al. ................. 455/557 |
| 2004/0092266 A1 * | 5/2004 | Olrik ........................... 455/445 |
| 2005/0066086 A1 * | 3/2005 | Ramanathan ................. 710/63 |

* cited by examiner

*Primary Examiner*—Edward Urban
*Assistant Examiner*—Adeel Haroon
(74) *Attorney, Agent, or Firm*—Michael J. Buchenhorner; Vazken Alexanian

(57) ABSTRACT

A method, information processing system and computer readable medium for emulating a mobile device on a computer is disclosed. The method includes storing an emulator program on the computer, wherein the emulator program imitates the functions and display of the mobile device. The method further includes establishing a connection between the mobile device and the computer and executing the emulator program on the computer, wherein an interface of the computer serves to interface with the emulator program. The method further includes synchronizing the emulator program and the mobile device such that the emulator program imitates in real time the functions and display of the mobile device. The method further allows the user to control and interact with the mobile devices from a centralized console on another device, such as a personal computer.

26 Claims, 5 Drawing Sheets

CENTRALIZED DISPLAY FOR MOBILE DEVICES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of wireless communications and more particularly relates to the field of user interfaces for wireless devices.

BACKGROUND OF THE INVENTION

With the popularity of mobile devices on the rise, people are experiencing the freedom of mobility. Employees, students, travelers and every-day individuals can communicate, send and receive information and process data while on the road. This has lead to the development of a variety of mobile devices for performing various operations while in the field. As a result, many individuals often tote a variety of mobile devices on their person, such as a mobile telephone for voice communication, a messaging device for email communication, a Personal Digital Assistant (PDA) for calendar events and other processing operations, an MP3 player for hearing music and a mobile game console for playing games. Having so many mobile devices to operate, however, does not come without its drawbacks.

It can be a complex exercise to have a variety of mobile devices. Email and voice mail, for example, can become difficult to manage when a user has more than one mobile device for receiving messages. For instance, if a user possesses a messaging device, such as a Blackberry device, but does not have the device on his person, he may miss an email message that arrives while he is separated from the device. The user may not be reunited with the device until a later time when it may be too late to reply to the email. In another example, a user may turn off his mobile telephone (or place it in silent mode) during a meeting, or other occasion when silence is necessary, and he may miss a voice email message that arrives while the device is silent. Again, the user may not turn on the device (or activate its sound) until a later time when it may be too late to reply to the voice mail. Even worse, the user may forget to turn on the device (or activate its sound), also resulting in missed calls and messages. Thus, there is an increased burden on the user to check his mobile devices for messages on a regular basis throughout the day. This problem is compounded when a user possesses multiple mobile devices that receive messages of varying kind.

Therefore, a need exists to overcome the problems with the prior art as discussed above, and particularly for a way to simplify the task of managing messages and calls on multiple mobile devices.

SUMMARY OF THE INVENTION

Briefly, according to an embodiment of the present invention, a method for emulating a mobile device on a computer is disclosed. The method includes storing an emulator program on the computer, wherein the emulator program imitates the functions and display of the mobile device. The method further includes establishing a connection between the mobile device and the computer and executing the emulator program on the computer, wherein an interface of the computer serves to interface with the emulator program. The method further includes synchronizing the emulator program and the mobile device such that the emulator program imitates in real time the functions and display of the mobile device. The method further allows the user to control and interact with the mobile devices from a centralized console on another device, such as a personal computer.

Also disclosed is an information processing system for emulating a mobile device. The information processing system includes a memory for storing an emulator program, wherein the emulator program imitates the functions and display of the mobile device. The information processing system further includes an interface for establishing a connection with the mobile device. The information processing system further includes a processor configured for executing the emulator program such that an interface of the information processing system serves to interface with the mobile device and for synchronizing the emulator program and the mobile device such that the emulator program imitates in real time the functions and display of the mobile device. The information processing system also includes software emulators to emulate mobile devices. The emulators could be supplied by the manufacturer of the mobile device or by third party vendors. A control protocol that relays messages between the mobile devices and the central console is also defined.

The method can also be implemented as machine executable instructions executed by a programmable information processing system or as hard coded logic in a specialized computing apparatus such as an application-specific integrated circuit (ASIC). Thus, also disclosed is a computer readable medium including computer instructions for emulating a mobile device on a computer. The computer readable medium includes instructions for storing an emulator program on the computer, wherein the emulator program imitates the functions and display of the mobile device and establishing a connection between the mobile device and the computer. The computer readable medium further includes instructions for executing the emulator program on the computer, wherein an interface of the computer serves to interface with the emulator program and synchronizing the emulator program and the mobile device such that the emulator program imitates in real time the functions and display of the mobile device.

Also disclosed is a method for alerting a user of a call or message. The method includes detecting a presence of the user and receiving, from at least one of a plurality of mobile devices of the user, information associated with a call or message. The method further includes alerting the user of the call or message The described embodiments of the present invention are advantageous as they allow for the quick and easy detection and response to incoming calls or messages. This results in a more immediate and efficient process of handling incoming calls and messages. Another advantage of the present invention is the elimination of the need to carry all mobile devices on one's person in order to be available to receive and respond to incoming messages and calls. With one centralized display for all incoming calls and messages, the user is free to be separated from his mobile devices while still having access to incoming calls and messages. This results in increased usability and user-friendliness of messaging and call features of the mobile devices.

Yet another advantage of the present invention is the use of a display, such as a monitor, to access the functions of a wireless device. Because wireless devices are typically small in size, they usually have small displays and interfaces which can be cumbersome and difficult to use. The present invention allows a user to access the functions of a wireless device on a conventional, larger display with the option of using a mouse and other interface devices to interact with the wireless device. This allows for greater ease of use and speed in the utilization of the wireless device.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
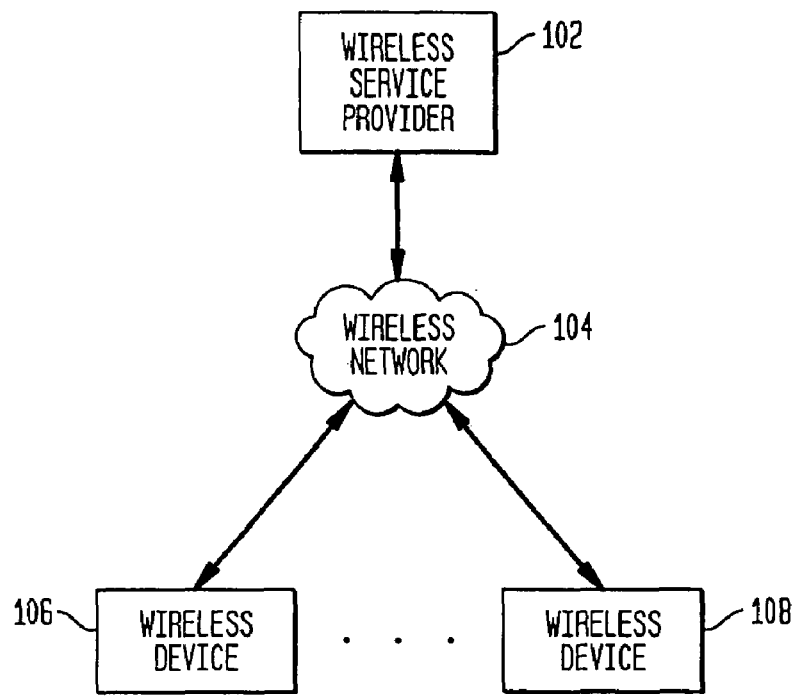
FIG. 1 is a block diagram illustrating a wireless communication system according to one embodiment of the present invention.

FIG. 1 is a block diagram illustrating a wireless communication system according to one embodiment of the present invention. The exemplary wireless communication system of FIG. 1 includes a wireless service provider 102, a wireless network 104 and wireless devices 106 through 108. The wireless service provider 102 is a first-generation analog mobile phone service, a second-generation digital mobile phone service or a third-generation Internet-capable mobile phone service. The exemplary wireless network 104 is a mobile phone network, a mobile text messaging device network, a pager network, or the like. Further, the communications standard of the wireless network 104 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like. The wireless network 104 supports any number of wireless devices 106 through 108, which are mobile phones, push-to-talk mobile radios, text messaging devices, email messaging devices (such as a Black berry device) handheld computers, pagers, beepers, or the like.

In an embodiment of the present invention, the wireless network 104 provides a variety of functions including two-way digital radio, digital wireless phone service, alphanumeric messaging and data/fax capabilities leveraging Internet access technology. The wireless devices 106-108 can further include a variety of features, including speakerphone, voice command, phone book, voice mail, digital two-way radio, mobile Internet and e-mail, wireless modems, voice activation, and voice recordings.

Figure 2:
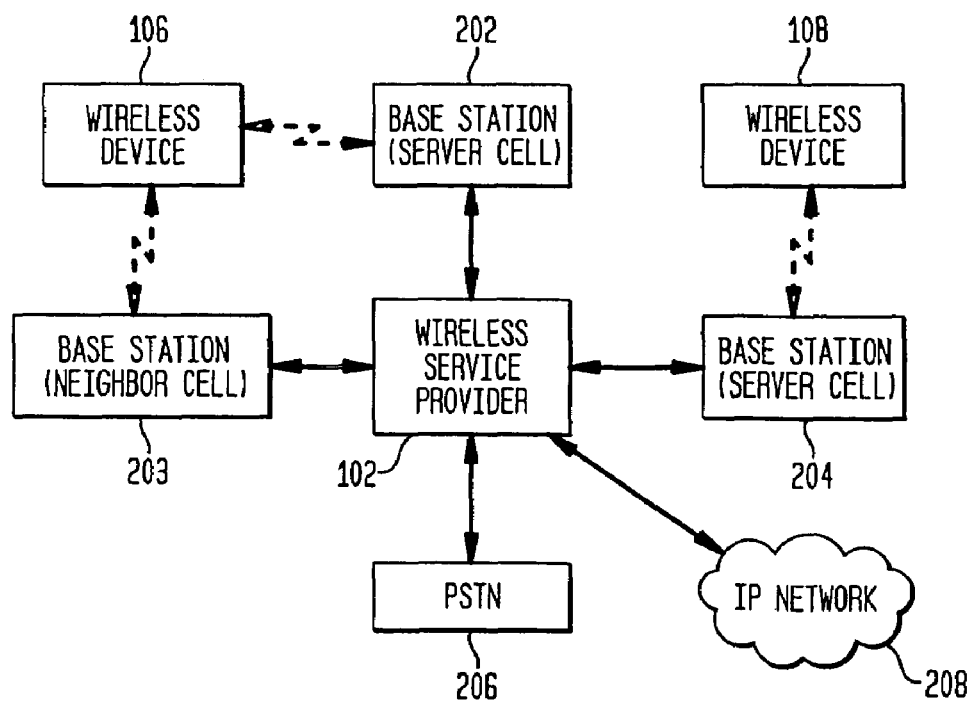
FIG. 2 is a more detailed block diagram of the wireless communication system of FIG. 1.

FIG. 2 is a more detailed block diagram of the wireless communication system of FIG. 1. The wireless communication system of FIG. 2 includes wireless service provider 102 coupled to the wireless network 104, which is represented in FIG. 2 by base stations 202, 203, 204. The aforementioned base stations support any of the communication standards cited above. In addition, the wireless communication system of FIG. 2 is interfaced to the Public Switched Telephone Network (PSTN) 206 and an Internet Protocol (IP) network 208. The base stations 202, 203, 204 individually support portions of a geographic coverage area containing subscriber units or transceivers (i.e., mobile devices) 106 and 108 (see FIG. 1). The mobile devices 106 and 108 interface with the base stations 202, 203, 204 using a communication protocol, such as CDMA, FDMA, CDMA, GPRS or GSM.

The geographic coverage area of the wireless communication system of FIG. 2 is divided into regions or cells, which are individually serviced by the base stations 202, 203, 204 (also referred to herein as cell servers). A mobile device operating within the wireless communication system selects a particular cell server as its primary interface for receive and transmit operations within the system. For example, mobile device 106 has cell server 202 as its primary cell server, and mobile device 108 has cell server 204 as its primary cell server. Preferably, a mobile device selects a cell server that provides the best communication interface into the wireless communication system. Ordinarily, this will depend on the signal quality of communication signals between a mobile device and a particular cell server.

As a mobile device moves between various geographic locations in the coverage area, a hand-off or hand-over may be necessary to another cell server, which will then function as the primary cell server. A mobile device monitors communication signals from base stations servicing neighboring cells to determine the most appropriate new server for hand-off purposes. Besides monitoring the quality of a transmitted signal from a neighboring cell server, the mobile device also monitors the transmitted color code information associated with the transmitted signal to quickly identify which neighbor cell server is the source of the transmitted signal.

In an embodiment of the present invention, the network 208 is a circuit switched network or a packet switched network such as a wide area network (WAN) (i.e., the global Internet), a private WAN, a telecommunications network or any combination of the above-mentioned networks. In yet another embodiment, the network 208 is a wired network, a wireless network, a broadcast network or a point-to-point network.

Figure 3:
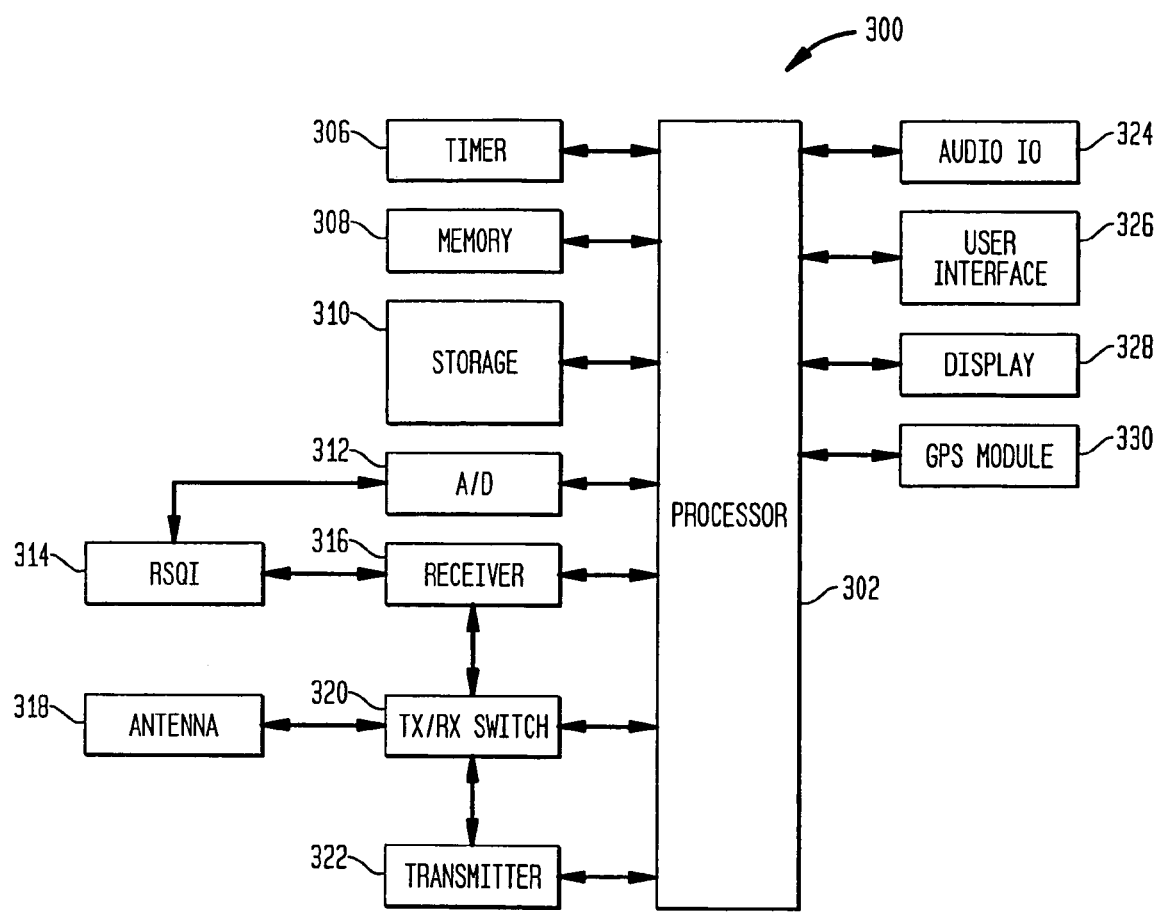
FIG. 3 is a block diagram illustrating a wireless device according to a preferred embodiment of the present invention.

FIG. 3 is a block diagram illustrating a wireless device 300 according to a preferred embodiment of the present invention. FIG. 3 shows a mobile telephone wireless device 300. In one embodiment of the present invention, the wireless device 300 is a two-way radio capable of receiving and transmitting radio frequency signals over a communication channel under a communications protocol such as CDMA, TDMA, GSM, GPRS, FDMA or the like.

Processor 302 in FIG. 3 performs various functions described below. In various embodiments of the present invention, the processor 302 in FIG. 3 comprises a single processor or more than one processor for performing the tasks described below. The wireless device 300 operates under the control of the processor 302, which switches the wireless device 300 between receive and transmit modes. In receive mode, the controller 302 couples an antenna 318 through a transmit/receive switch 320 to a receiver 316. The receiver 316 decodes the received signals and provides those decoded signals to the processor 302. In transmit mode, the processor 302 couples the antenna 318, through the switch 320, to a transmitter 322. In one embodiment, the receiver 316 and transmitter 322 support a short range wireless protocol such as IEEE 802.11(a), IEEE 802.11(b), IEEE 802.11(g), IrDA (Infrared Data Association) or Bluetooth.

FIG. 3 also includes a storage module 310 for storing information that may be used during the overall processes of the present invention. Further, the processor 302 operates the transmitter 322 and receiver 316 according to instructions stored in memory 308. These instructions include a neighbor cell measurement-scheduling algorithm. In preferred embodiments of the present invention, memory 308 comprises any one or any combination of non-volatile memory, flash memory or Random Access Memory. A timer module 306 provides timing information to the processor 302 to keep track of timed events. Further, the processor 302 utilizes the time information from the timer module 306 to keep track of scheduling for neighbor cell server transmissions and transmitted color code information.

When a neighbor cell measurement is scheduled, the receiver 316, under the control of the processor 302, monitors neighbor cell servers and receives a "received signal quality indicator" (RSQI). An RSQI circuit 314 generates RSQI signals representing the signal quality of the signals transmitted by each monitored cell server. Each RSQI signal is converted to digital information by an analog-to-digital converter 312 and provided as input to the processor 302. Using the color code information and the associated received signal quality indicator, the wireless device 300 determines the most appropriate neighbor cell server to use as a primary cell server when hand-off is necessary.

In one embodiment, the wireless device 300 is a wireless telephone. For this embodiment, the wireless device 300 of FIG. 3 further includes an audio input/output module 324 for allowing the input of audio into the wireless device 300 and the output of audio for listening by a user. Also included is a user interface 326 for allowing the user to interact with the wireless device 300, such as modifying address book information, interacting with call data information and making/answering calls. Wireless device 300 further includes a display 328 for displaying information to the user of the mobile telephone.

FIG. 3 also shows an optional Global Positioning System (GPS) module 330 for determining location and/or velocity information of the wireless device 300. This module 330 uses the GPS satellite system to determine the location and/or velocity of the wireless device 300. Alternative to the GPS module 330, the wireless device 300 may include alternative modules for determining the location and/or velocity of wireless device 300, such as using cell tower triangulation and assisted GPS.

Figure 4:
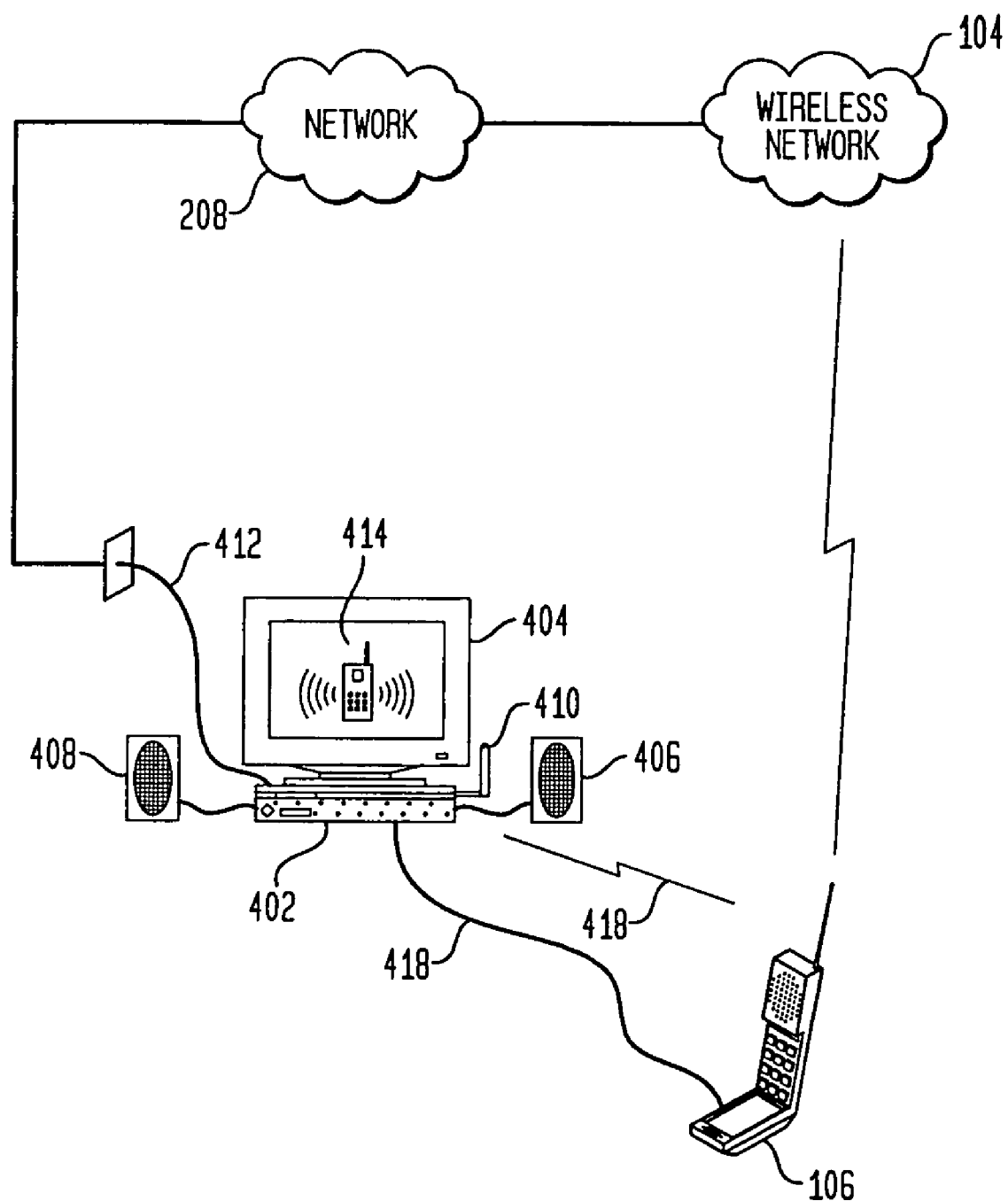
FIG. 4 is a block diagram showing one embodiment of the present invention.

FIG. 4 is a block diagram showing one embodiment of the present invention. FIG. 4 shows a desktop computer 402 including a CPU, a monitor 404, speakers 406 and 408 and a receiving antenna 410. Although a desktop-type computer is shown, the computer 402 can be any type of information processing system, such as a laptop computer, a handheld computer, a palm-top computer, a mobile telephone, a messaging device, or the like. Also shown is a wireless device 106, e.g., a mobile telephone. Note that although only one wireless device is shown, the present invention supports any number of wireless devices.

Monitor 404 serves to provide a graphical interface for the user. Alternatively, the computer 402 may utilize a projector-type unit to provide a graphical interface for the user. Speakers 406 and 408 serve to provide audio output to a user. A microphone (not shown) can be embedded in the speakers 406-408 for providing audio input capabilities to a user. Receiver/transmitter 410 is utilized for reception, transmission and processing of wireless signals. In another embodiment, the receiver/transmitter 410 supports a short range wireless protocol such as IEEE 802.11(a), IEEE 802.11(b), IEEE 802.11(g), IrDA or Bluetooth. A more detailed description of a computer 402 is provided below with reference to FIG. 6.

FIG. 4 further shows that computer 402 includes a connection 412, comprising a wire-line connection to a network 208, such as a LAN, a WAN or the Internet, as described in greater detail above with reference to FIG. 2 above. In another embodiment, the connection 412 can be a wireless connection using a wireless protocol such as those described for receiver/transmitter 410. This connection would connect to a wireless port, such as a wireless router. FIG. 4 also shows a wireless device 106, e.g., a mobile telephone, that is connected to the wireless network 104 wirelessly, as described in greater detail above with reference to FIGS. 1 and 2 above.

FIG. 4 may also include a mechanism for translating protocols between the wireless network 104 and the computer network 208. Typically, a wireless network such as 104 operates under a telephony protocol similar to that of the PSTN 206. A computer network 208 supports a protocol such as the Voice over Internet Protocol (VoIP) for exchanging telephony information. Thus, the architecture of FIG. 4 may also include a VoIP/PSTN gateway (not shown) between network 208 and network 104 for translating protocol information between the two networks. The Session Initiation Protocol (SIP) is used to control access to the networks 104, 208 and switching between these networks.

Wireless device 106 may also communicate with the computer 402 via a connection 418, which may be a wire-line connection or a wireless connection. As a wire-line connection, a standard wire connector, such as a USB connector, a FireWire connector, a serial connector or the like, may be used for connection 418. As a wireless connector, a short range wireless protocol, such as those described for receiver/transmitter 410, may be used.

Lastly, the computer 402 shows an icon 414 presented on the display 404. The display 404 presents the icon 414 in response to a signal received, as described below. Briefly, a call or message is received by the wireless device 106 via the wireless network 104. A call comprises a telephone call, a two-way radio call or other type of voice call. A message comprises a text message, an alphanumeric message, an email message or other type of informational message. Next, the call or message is routed to the computer 402. The call or message may be routed to the computer 402 via the connection 412. Alternatively, the call or message may be routed to the computer 402 from the wireless network 104 via the network 208 and the connection 418. Upon reception of the call or message, the computer 402 proceeds to present the icon 414 to indicate that a call or message has been received. Note that the icon 414 resembles the mobile device 106. The process of routing a call or message is described in greater detail below with reference to FIG. 5.

Figure 5:
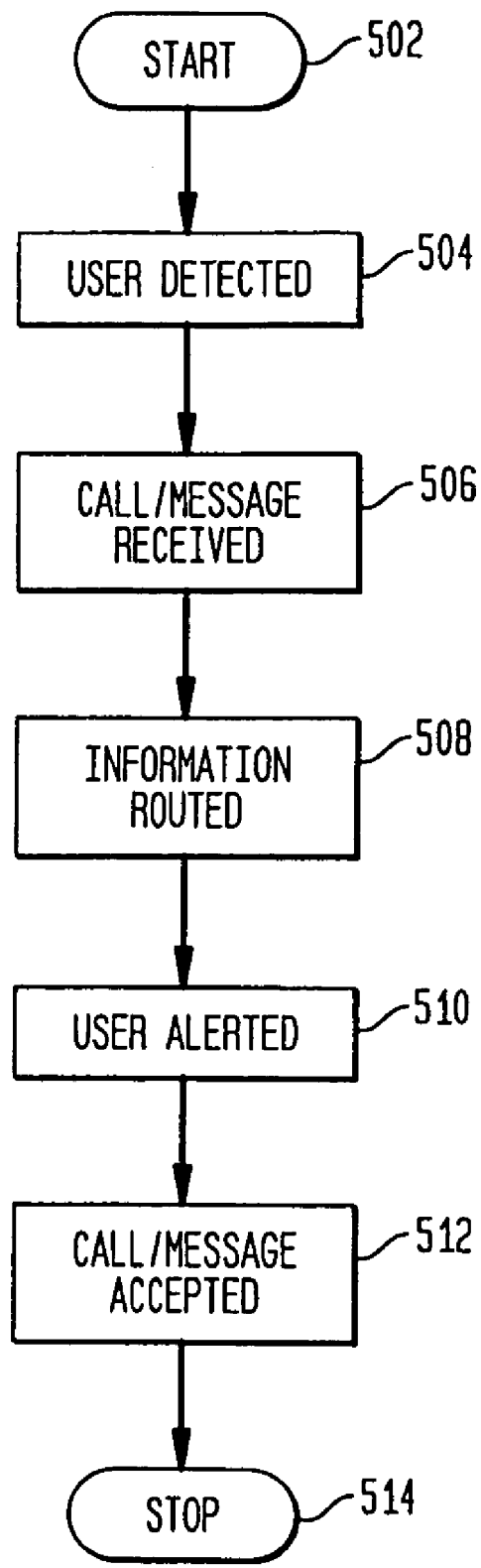
FIG. 5 is a flowchart showing the control flow of the process of one embodiment of the present invention.

FIG. 5 is a flowchart showing the control flow of the process of one embodiment of the present invention. FIG. 5 shows the process by which calls and messages for a user are routed to a centralized location, i.e., the computer 402. The control flow of FIG. 5 begins with step 502 and flows directly to step 504.

In optional step 504, the presence of a user is detected by the computer 402. This may occur in a variety of ways. One way that the presence of the user can be detected by the computer 402 is by the user logging into a user account at the computer 402. Alternatively, the computer 402 can detect the user by using a sensor such as a heat sensor, a biometric sensor or the like. In another alternative, the computer 402 can detect the user by detecting a mobile device (using wireless signals) belonging to the user. In yet another alternative, the wireless device 106 may use a GPS module, such as module 330, to determine its location. This location can then be communicated to the wireless network 104, through the network 208 and connection 418 to computer 402.

In step 506, a call or message is received by the wireless device 106 via the wireless network 104. Next, in step 508, information associated with the call or message is routed from the mobile device 106 to the computer 402 via the connection 412. To do so, a module or routine residing on the mobile device 106 is programmed to recognize when the mobile device 106 is within the vicinity of the computer 402 and accordingly routes information associated with the calls and messages to the computer 402. Alternatively, the information associated with the call or message may be routed to the computer 402 directly from the wireless network 104 via the network 208 and the connection 412. To do so, a module or routine residing on the wireless network 104 is programmed to recognize when the mobile device 106 is within the vicinity of the computer 402 and accordingly routes information associated with the calls and messages to the computer 402. In one embodiment, the wireless device 106 or the network 104 routes the call or message itself (in its entirety) to the computer 402. This is described in greater detail below.

The information that is routed to the computer 402 may comprise a variety of information. For example, the mobile device 106, or the wireless network 104 (depending on which component routes the information to the computer 402—see above) may send the time the call or message was received or the time the call or message was sent. The mobile device 106, or the wireless network 104, may also send a return address (such as a telephone number or an email address) of a sender of the call or message or an identifier (such as a name or handle) of a sender of the call or message. The mobile device 106, or the wireless network 104, may also send audio or video of the call or message, such as a voice and/or audio clip of the call or the sender of the call.

In step 510, upon reception of the call or message, the computer 402 proceeds to alert the user that a call or message has been received. As noted above, the computer 402 includes a display 414 and audio speakers 406. Thus, the computer 402 can issue an audio alert comprising a sound or series of sounds, a visual alert such as a still image or a video or any combination of a video alert and audio alert. The alert issued from the computer 402 may include any information that is garnered from the call or message in step 508. Note that in FIG. 4 the computer 402 presents an icon 414, resembling the mobile device 106, as an alert. If the user carries a plurality of mobile devices, using an icon resembling the mobile device receiving a call or message serves to indicate which mobile device requires attending. For example, an icon resembling a mobile telephone can be used to indicate that a call is being received at the mobile telephone of the user, while an icon resembling a pager can be used to indicate that a text message is being received at the pager of the user.

In optional step 512, the user proceeds to open or view the message or answer the call received. That is, if a telephone call is received, the user may choose to accept the call via the computer 402. In this embodiment, the wireless device 106 or the network 104 routes the call or message itself (in its entirety) to the computer 402, as described above. Thus, the user can open a message on the computer 402 and access the messaging functions provided on the computer 402 to read, process and respond to the message. Likewise, the user can accept a call on the computer 402 and access the call functions provided on the computer 402 to communicate during a call. The microphone and speakers of the computer 402 can be utilized to participate in a telephone call. In step 514, the control flow of FIG. 5 stops.

As explained above, the present invention allows a user to access call and message functions of the mobile device 106 on the computer 402. In one embodiment of the present invention, the computer 402 allows a user to access all functions of the wireless device 106. For example, for mobile telephone 106, the computer 402 allows the user to access all contact lists, ring tone functions, call information and applications such as games. In another example, for a wireless device comprising a messaging device, the computer 402 allows the user to access all email address lists, email messages, contact information and applications such as word processors.

In an embodiment of the present invention, an emulator of the mobile device 106 resides on the computer 402. An emulator is an application on the computer 402 that mimics or imitates the functions and displays of the mobile device 106. The manufacturer of the mobile device 106 or a third party may provide the emulator for use on a computer 402. Any actions or tasks that can be executed by the mobile device 106 can also be executed by the emulator on the computer 402. The emulator on the computer 402 also includes a graphical user interface (GUI) displayed on the monitor 414 such that the GUI is identical to the physical interface of the mobile device 106. Thus, the emulator includes a GUI having the same buttons, display and other input/output mechanisms as the mobile device 106, in addition to the same functions and actions. In addition to imitating the display, buttons and I/O mechanisms of the mobile device 106, the emulator generally imitates the look and feel of the mobile device 106, including the colors used, the styling of the fonts and interface and the textures of the device.

Moreover, the emulator on the computer 402 is linked with the mobile device 106 (via connection 418) so as to emulate in real-time the actions and functions of wireless device 106. Emulation in real-time refers to the near-immediate presence of identical information in both the mobile device 106 and the monitor of the computer 402. Thus, as information is input into the mobile device 106 via an interface such as a keyboard, the information is immediately sent to the computer 402 for viewing on the monitor 404. Likewise, as information is input into the computer 402 via an interface such as a keyboard, the information is immediately sent to the mobile device 106 for viewing on its display.

Thus, pressing a button on the mobile device 106 is equivalent to pressing the same button on the emulator, and vice versa. In another example, entering information into the GUI of the emulator on the computer 402 is equivalent to entering information into the mobile device 106. That is, as the mobile device 106 executes tasks and displays information, the emulator on the computer 402 reflects the functions and displays of mobile device 106. Thus, the emulator and the mobile device 106 work in harmony. In this fashion, the emulator on the computer 402 acts as a mirror of the mobile device 106.

Using an emulation of the mobile device 106 on the monitor 404 of the computer 402, the user may interact with the emulation of the mobile device 106 in lieu of the mobile device itself. For example, the user of a mobile messaging device (that receives email) can access email on the emulation of the messaging device on the monitor 404 of the computer 402 in lieu of accessing the email on the messaging device itself. In another example, the user of a mobile telephone can access his telephone number list on the emulation of the mobile telephone on the monitor 404 of the computer 402 in lieu of accessing the telephone number list on the mobile telephone itself.

In another embodiment of the present invention, the emulator of the mobile device 106 on the computer 402 includes additional features that are not supported by the mobile device 106. For example, if a call is received for a mobile device 106, the emulator on the computer 402 may display a photo of the person initiating the call on the monitor 404. In another example, if a call is received for the mobile device 106, the emulator on the computer 402 may display on the monitor 404 the last time the caller made a call to the mobile device, the last time the user spoke with the caller, etc.

The use of a display 404, such as a monitor, to access the functions of the mobile device 106 is beneficial because wireless devices are typically small in size and they usually have small displays and interfaces. This can be cumbersome and difficult to use. Allowing the user to access all of the functions of the mobile device 106 on a conventional, larger display 404 with the option of using a mouse and other interface devices to interact with the mobile device 106 is desirable. This allows for greater ease of use and speed in the utilization of the mobile device 106.

For example, larger (and therefore easier to read) fonts are used on the emulator on the computer 402 than on the mobile device 106, since the mobile device is smaller in size. In another example, the typical spelling convention on a mobile device 106 (wherein a user presses a key a certain number of times to specify a letter corresponding to the key; for example, pressing the "2" key three times to specify the letter "C") is no longer necessary since a keyboard or other input device on the computer 402 (which is easier to use) can be utilized. In yet another example, text characters can be displayed using a higher number of pixels on the monitor 404 of the computer 402, thereby increasing the resolution and the readability of the characters.

In an embodiment of the present invention, a security feature can be integrated into the call/message presentation capabilities of the computer 402. As explained above, the present invention allows a call or message to be presented and or routed to the computer 402. At times, the user of the computer 402 may not desire to have a message displayed on the monitor 404 or a call output to speakers 406-408. For example, the subject matter of a call or message may be personal, confidential or sensitive and the user may not want to have the subject matter of the call or message displayed on the monitor or output to the speakers.

In one embodiment of the present invention, the computer 402 can detect people other than the user by using a sensor such as a heat sensor, a biometric sensor or the like. If a person other than the user is detected, the computer 402 will not display a message on the monitor 404 or output a call to the speakers 406-408. In this case, the computer 402 may simply indicate that a call or message has been received by showing an icon or other visual device, without disclosing the subject matter of the call or message. In another embodiment of the present invention, the computer 402 can detect information associated with the environment of the user (such as whether the user's office door is closed, whether the user is located outdoors or whether the user is located in any location lacking privacy) by using a sensor. If it is detected that the user is located in a location lacking privacy, the computer 402 can display on the monitor 404 reduced information associated with the call or message, or the computer can output reduced information about the call to the speakers 406-408. In this case, the computer 402 may simply indicate that a call or message has been received by showing an icon or other visual device, or disclosing reduced information regarding the subject matter of the call or message. The user may predefine the information that may be disclosed in situations where he is lacking privacy.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 6:
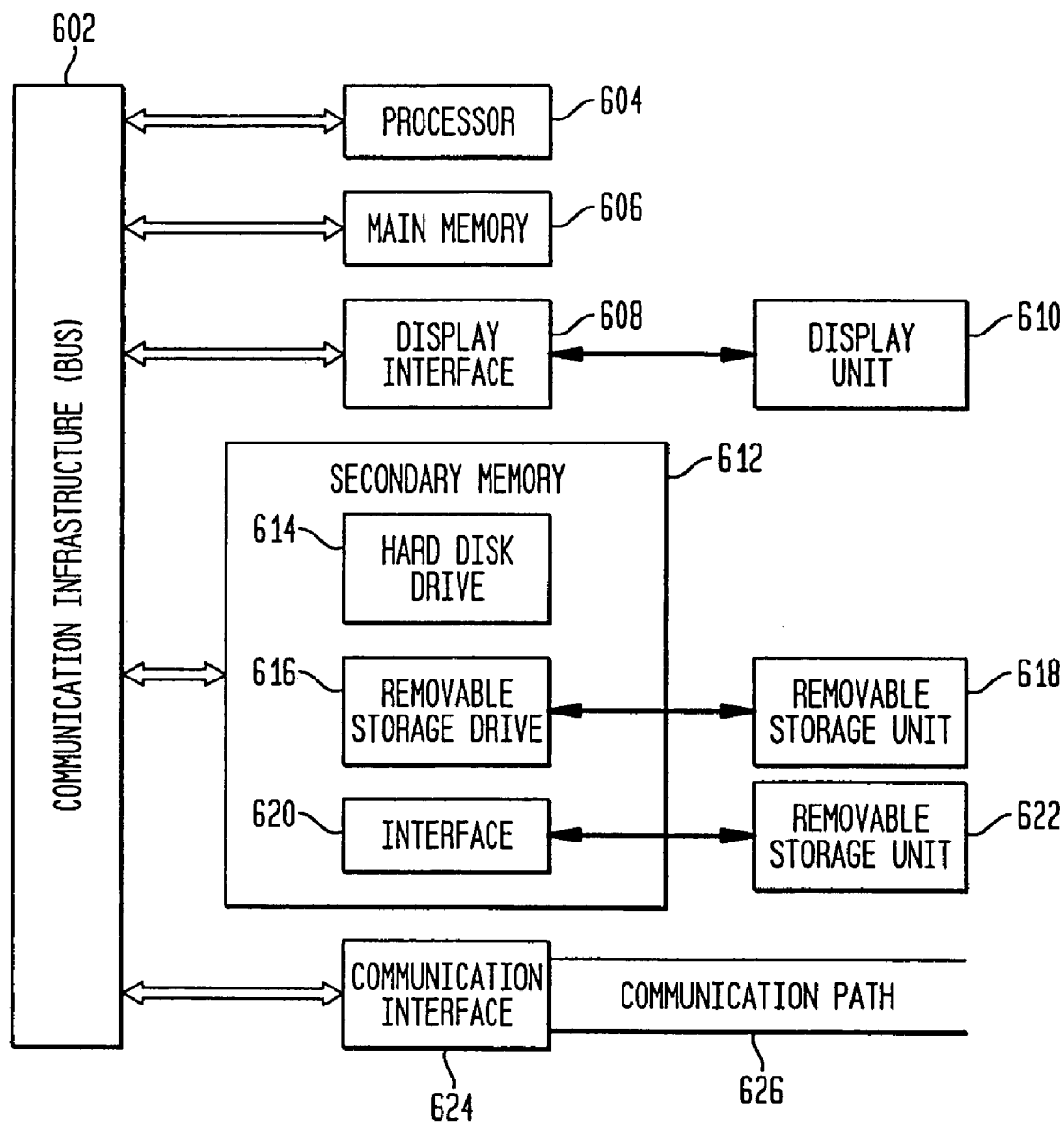
FIG. 6 is a high level block diagram showing an information processing system useful for implementing one embodiment of the present invention.

FIG. 6 is a high level block diagram showing an information processing system useful for implementing one embodiment of the present invention. The computer system of FIG. 6 is one embodiment of the computer 402 of FIG. 4. The computer system includes one or more processors, such as processor 604. The processor 604 is connected to a communication infrastructure 602 (e.g., a communications bus, crossover bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 608 that forwards graphics, text, and other data from the communication infrastructure 602 (or from a frame buffer not shown) for display on the display unit 610. The computer system also includes a main memory 606, preferably random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. Removable storage unit 618, represents a floppy disk, a compact disc, magnetic tape, optical disk, etc. which is read by and written to by removable storage drive 616. As will be appreciated, the removable storage unit 618 includes a computer readable medium having stored therein computer software and/or data.

In alternative embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system.

The computer system may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (i.e., channel) 626. This channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 606 and/or secondary memory 612. Computer programs may also be received via communications interface 624. Such computer programs, when executed, enable the computer system to perform the features of the present invention as discussed herein. In particular, the computer programs, when executed, enable the processor 604 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method for emulating at least one of a plurality of mobile devices selected from a group consisting of: a mobile phone, a mobile radio, a personal digital assistant, a handheld computer, a pager, and a beeper, on an emulating computer having a larger display than the at least one of the plurality of mobile devices, the method comprising:

storing an emulator program on the emulating computer, wherein the emulator program emulates at least some functions, controls, and display of the mobile devices such that any actions or tasks that can be executed by the mobile device can also be executed by the emulator program on the emulating computer, wherein the emulator program comprises a security feature that automatically modifies a presentation function if it perceives that a user of the mobile device is not alone;

establishing a connection between the at least one of the plurality of mobile devices and the emulating computer;

displaying an emulated graphical user interface (GUI) on a display of the emulating computer such that the emulated GUI emulates a physical interface of the at least one mobile device;

executing the emulator program on the emulating computer;

interfacing with the emulator program by interacting with the emulated GUI so that at least some input/output applications of the at least one mobile device are emulated on the emulating computer, wherein the interfacing step comprises a step of modifying a requested emulated presentation function if the security feature perceives that the user is not alone;

performing on the emulating computer at least some of the functions of the at least one mobile device that are not supported by the mobile device; and synchronizing the emulator program and the at least one mobile device such that the emulator program imitates in real time the functions and display of the at least one mobile device.

2. The method of claim 1, wherein the element of establishing a connection further comprises: establishing any one of a wireless and a wire-line connection between the at least one mobile device and the emulating computer.

3. The method of claim 1, wherein the element of executing the emulator program further comprises: executing the emulator program on the emulating computer, wherein one or more of a keyboard, a mouse, a touch pad, a touch screen, a roller ball, a gaming input device, and a voice input device serve to interface with the emulator program.

4. The method of claim 1, further comprising: synchronizing information input between the emulating computer and the at least one mobile device.

5. The method of claim 1, further comprising: synchronizing information input into the at least one mobile device with the emulating computer.

6. The method of claim 1, further comprising:
storing a plurality of emulator programs on the emulating computer, wherein each emulator program imitates the functions and display of a corresponding mobile device of the plurality of mobile devices;
establishing a connection between each of the plurality of mobile devices and the emulating computer;
executing the plurality of emulator programs on the emulating computer, wherein an interface of the emulating computer serves to interface with the plurality of emulator programs; and
synchronizing the plurality of emulator programs and the plurality of mobile devices such that each emulator program imitates in real time the functions and display of its corresponding mobile device.

7. The method of claim 1 wherein the emulating computer supports the mobile device.

8. The method of claim 1 further comprising sending from the at least one mobile device to the emulating computer temporal data of a call or message received at the mobile device.

9. The method of claim 8 further comprising sending from the mobile device, an identifier of a sender of the call or the message.

10. The method of claim 8 further comprising sending to the emulating computer at least one of: audio or video of the call or the message received at the mobile device.

11. The method of claim 10 wherein the sending to the emulating computer occurs responsive to the emulating computer detecting that the mobile device is within range of the emulating computer.

12. An emulating information processing system for emulating at least one of a plurality of mobile devices selected from a group consisting of: a mobile phone, a mobile radio, a personal digital assistant, a handheld computer, a pager, and a beeper, the system comprising:
an emulator program stored in the memory of an emulator computer, wherein the emulator program imitates functions and display of the at least one mobile device on said emulator computer and provides functions not supported by the at least one mobile device, wherein the emulator program comprises a security feature that automatically modifies a presentation function if it perceives that a user of the mobile device is not alone;
a communication interface for establishing a connection between the mobile device and the emulator computer, the communication interface coupled with a graphical user interface for establishing a connection interacting with the at least one mobile device from the emulator computer;
a display comprising the graphical user interface for displaying the same buttons, display and other input/output mechanisms as the at least one mobile device, wherein the display is larger than a display on the at least one mobile device;
a processor configured for executing the emulator program such that the graphical user interface serves to interface with the at least one mobile device and for synchronizing the emulator program and the mobile device such that the emulator program imitates in real time the functions and display of the at least one mobile device.

13. The emulating information processing system of claim 12, wherein the communication interface comprises any one of a wireless and a wire-line connection between the at least one mobile device and the emulating information processing system.

14. The emulating information processing system of claim 12, wherein the information processing system includes at least one of: a keyboard, a mouse, a touch pad, a touch screen, a roller ball, a gaming input device, and a voice input device that serves to interface with the emulator program.

15. The emulating information processing system of claim 14 further comprising a module residing in the mobile device configured to perceive when the mobile device is within range of the emulating computer.

16. The emulating information processing system of claim 12, further comprising: a transmitter for transmitting to the at least one mobile device information input into the information processing system.

17. The emulating information processing system of claim 12, further comprising: a receiver for receiving from the at least one mobile device information input into the mobile device.

18. The emulating information processing system of claim 12, wherein the memory comprises a read-only memory.

19. The emulating information processing system of claim 12, wherein the memory comprises a random-access memory.

20. The emulating information processing system of claim 12, wherein the processor comprises an application specific integrated circuit.

21. The emulating information processing system of claim 12, further comprising: a display for displaying a graphical user interface of the emulator program, wherein the graphical user interface is a larger-sized emulation of an interface of the mobile device.

22. The emulating information processing system of claim 12 wherein the system supports the mobile device.

23. A computer readable storage medium comprising a computer program product for emulating an mobile device on an emulating computer, the computer program product comprising instructions for:
storing an emulator program on the emulating computer, wherein the emulator program imitates at least some of the functions, controls, and display of the mobile device such that any actions or tasks that can be executed by the mobile device can also be executed by the emulator program on the computer, and wherein the emulator program comprises a security feature;
establishing a connection between the mobile device and the emulating computer;
displaying a graphical user interface (GUI) on a monitor of the emulating computer such that the GUI is identical to a physical interface of the mobile device;
executing the emulator program on the emulating computer, wherein an interface of the emulating computer serves to interface with the emulator program, wherein the executing instruction comprises instructions for modifying a requested emulated presentation function if the security feature perceives that the user is not alone; and
synchronizing the emulator program and the mobile device such that the emulator program imitates in real time the functions and display of the mobile device; and
detecting that the mobile device is within range of the connection between the mobile device and the emulating computer.

24. The computer readable storage medium of claim 23, wherein the instructions for storing further comprise instructions for: enabling the emulator program to imitate the functions and display of the mobile device.

25. The computer readable storage medium of claim 23, wherein the instructions for establishing a connection further comprise instructions for: establishing any one of a wireless and a wire-line connection between the mobile device and the emulating computer.

26. The computer readable storage medium of claim 23, wherein the instructions for executing further comprise instructions for: executing the emulator program on the emulating computer, wherein at least one of: a keyboard, a mouse, a touch pad, a touch screen, a roller ball, a gaming input device, and a voice input device serve to interface with the emulator program.

* * * * *